United States Patent
Turner et al.

(10) Patent No.: US 6,726,828 B2
(45) Date of Patent: Apr. 27, 2004

(54) ELECTROCHEMICAL PROCESSING

(75) Inventors: Andrew Derek Turner, Abingdon (GB); Christopher Peter Jones, Swindon (GB)

(73) Assignee: Accentus plc, Didcot (GB)

( * ) Notice: Subject to any disclaimer, the term of this patent is extended or adjusted under 35 U.S.C. 154(b) by 57 days.

(21) Appl. No.: 10/024,490

(22) Filed: Dec. 21, 2001

(65) Prior Publication Data
US 2002/0079234 A1 Jun. 27, 2002

(30) Foreign Application Priority Data
Dec. 21, 2000 (GB) ............................................. 00 31413

(51) Int. Cl.[7] ............................................. C25B 1/00
(52) U.S. Cl. ...................... 205/547; 205/466; 205/508; 205/539; 205/544; 205/545
(58) Field of Search ................. 205/466, 508, 205/539, 544, 545

(56) References Cited

U.S. PATENT DOCUMENTS

| | | | |
|---|---|---|---|
| 3,563,868 A | 2/1971 | Leja | 204/105 |
| 4,071,421 A | 1/1978 | Masters | 204/96 |
| 4,243,638 A | 1/1981 | Jackovitz | 423/17 |
| 4,362,607 A | 12/1982 | Ritcey | 204/108 |
| 4,401,531 A | 8/1983 | Lorenzo | 204/114 |
| 4,572,771 A | 2/1986 | Duyvesteyn | 204/118 |
| 4,634,507 A | 1/1987 | Nogueira | 204/118 |
| 4,891,067 A | 1/1990 | Rappas | 75/101 R |
| 5,336,297 A | 8/1994 | McElroy | 75/725 |
| 5,523,066 A * | 6/1996 | Geisler et al. | 423/98 |
| 5,849,172 A | 12/1998 | Allen | 205/581 |
| 6,113,773 A * | 9/2000 | Shimamune et al. | 205/466 |
| 6,517,701 B1 * | 2/2003 | Geisler | 205/538 |

FOREIGN PATENT DOCUMENTS

| | | |
|---|---|---|
| GB | 640352 | 7/1950 |
| GB | 856827 | 12/1960 |
| WO | 94/02663 | 2/1994 |
| WO | 96/29439 | 9/1996 |
| WO | 98/14623 | 4/1998 |

* cited by examiner

Primary Examiner—Arun S. Phasge
(74) Attorney, Agent, or Firm—William H. Holt (57) ABSTRACT

Using a solution mining procedure, an ore (10) is treated with a solution of acetic acid and hydrogen peroxide so as to form a leachate containing lead ions. Lead ions (and other metal ions such as zinc and manganese) are stripped (22, 24, 26) by solvent extraction from the leachate to form separate aqueous solutions. The aqueous solution containing lead ions is treated electrochemically in the anodic compartment of a separated electrochemical cell (42) to form a precipitate of lead oxide. Manganese dioxide can be produced similarly (72). A precipitate of zinc hydroxide can be formed in the cathode compartment of a separated electrochemical cell (56). In the cells (42, 72) extracting lead ions and manganese ions, the cathode compartment is used to generate hydrogen peroxide (for use in making the leachant), either directly or indirectly.

17 Claims, 8 Drawing Sheets

ELECTROCHEMICAL PROCESSING

This invention relates to a process for obtaining desired materials from rocks or subterranean strata, the process using electrochemical treatment of some of the liquid streams.

It is known to remove a desired material (such as a metal) from rock in situ by means of a leachant or leaching liquid. The leachant is caused to flow through the rock, for example between spaced-apart boreholes, so the desired material dissolves in it; the leachate is then treated to extract the desired material. This process may be referred to as solution mining. For example as described in U.S. Pat. No. 5,523,066, lead may be removed from ore using a solution of acetic acid and hydrogen peroxide as the leachant, as lead acetate is soluble. This generates a solution containing various salts including lead acetate, and it is difficult to obtain the lead in a useful form without at the same time creating significant quantities of waste products.

According to the present invention there is provided a method of solution mining in which an ore is treated with a solution of acetic acid and hydrogen peroxide so as to form a leachate containing lead ions and the lead is stripped by solvent extraction from the leachate to form an aqueous solution containing lead ions, wherein the aqueous solution containing lead ions is treated electrochemically in the anodic compartment of a separated electrochemical cell to form a precipitate of lead oxide.

The leachate may also contain zinc ions. In this case the zinc is stripped by solvent extraction from the leachate to form an aqueous solution containing zinc ions, and the aqueous solution containing zinc ions is preferably then treated electrochemically in the cathodic compartment of a separated electrochemical cell to form a precipitate of zinc hydroxide.

The leachate may also contain manganese ions. After stripping the manganese by solvent extraction from the leachate to form an aqueous solution containing manganese ions, the aqueous solution containing manganese ions is treated electrochemically in the anodic compartment of a separated electrochemical cell to form a precipitate of manganese dioxide.

In each case the aqueous solution containing metal ions, after passing through a respective compartment of the respective separated electrochemical cell, is preferably recirculated back to the same compartment via a separation means to remove the precipitate. The separation means may be a filter, or a settling vessel, or a cyclone or hydrocyclone.

In the case of the electrochemical cell to treat the aqueous solution of lead ions, and that used to treat the solution of manganese ions, the cathode compartment is preferably used to generate hydrogen peroxide (for use in making the leachant). This may be achieved directly, using a gas diffusion electrode as the cathode. Alternatively it may be achieved indirectly by generating hydrogen at the cathode which can be reacted with anthraquinone to form hydrogen peroxide; or using a water-soluble anthraquinone derivative that can be reduced at the cathode and subsequently reacted with air to form hydrogen peroxide.

In a second aspect, the present invention provides a method of solution mining in which an ore is treated with a leachant containing hydrogen peroxide, so as to form a leachate containing metal ions, and the metal ions are stripped from the leachate by solvent extraction to form an aqueous solution containing the metal ions, wherein the aqueous solution is treated electrochemically in an anodic compartment of a separated electrochemical cell, and the cathodic compartment of the cell is used directly or indirectly to generate hydrogen peroxide.

Typically, after removal of lead, zinc and manganese from the leachate, the principal cation remaining is calcium. The calcium ions can be removed, at least partially, by adding carbon dioxide to the solution, and then treating it electrochemically in the cathodic compartment of a separated electrochemical cell so as to precipitate calcium carbonate, which is then removed using a separation means, such as a hydrocyclone. If the leachate is treated to remove substantially all the metal ions, it may be regenerated as leachant.

The invention will now be further and more particularly described, by way of example only, and with reference to the accompanying drawings, in which.

Figure 1:
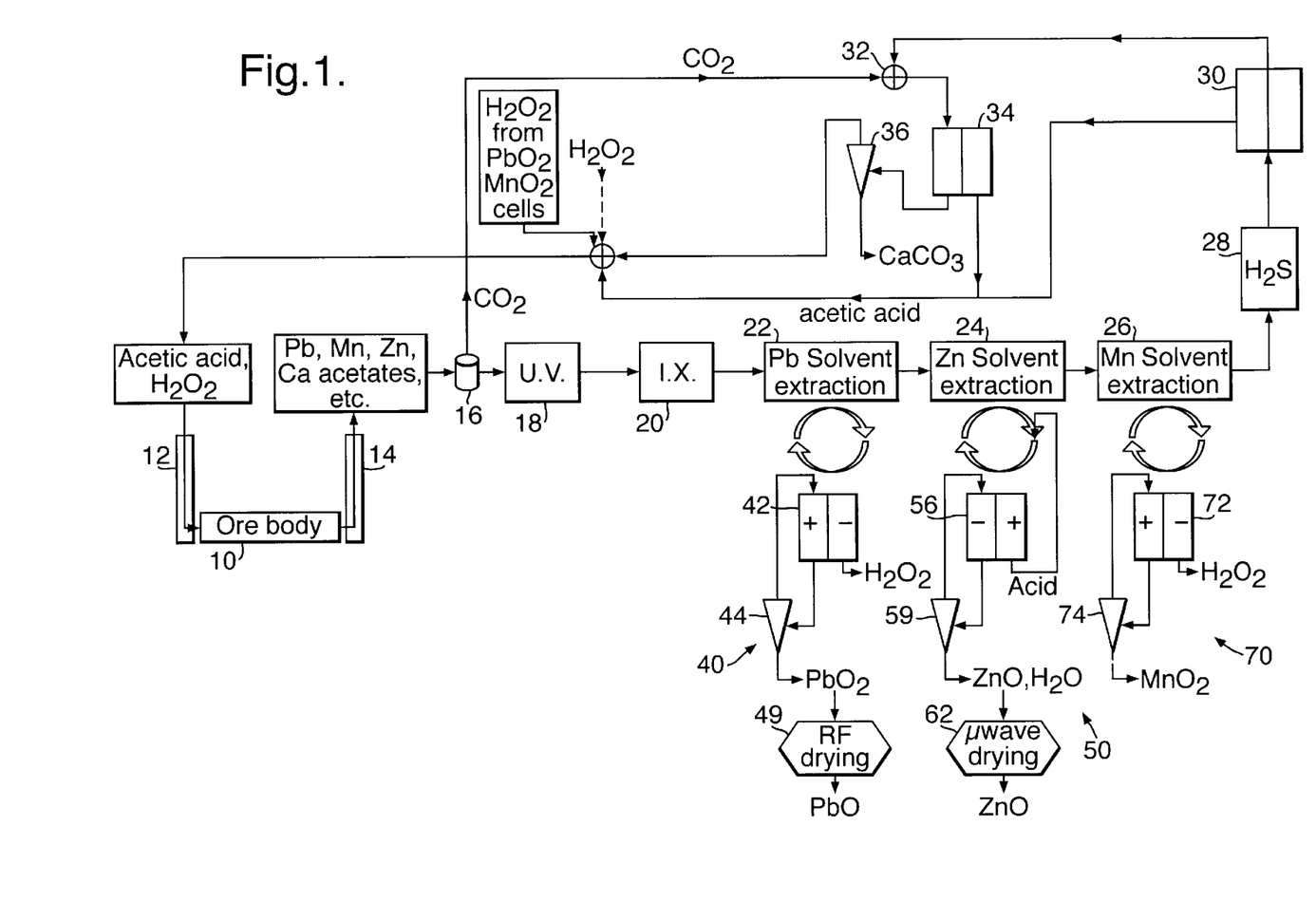
FIG. 1 shows a diagrammatic flow path for a solution mining plant.

Referring to FIG. 1, the solution mining in this example is intended to recover lead (and some other metals) from galena in a sandstone stratum 10, using acetic acid containing hydrogen peroxide as the leachant. Not only is this leachant effective for lead recovery but it is also acceptable from the points of view of low toxicity, biodegradability and public familiarity. The leachant is pumped into boreholes 12 in the sandstone strata 10 and extracted from a central borehole 14 so that the leachant travels a distance typically of about 30 m to 100 m through the sandstone, and is resident in the sandstone for a period of about 2 or 3 hours. Calcium acetate resulting from the dissolution of any limestone in the rock is not only soluble, thus leading to enhanced permeability due to pore enlargement, but it also acts as a better leachant of the galena ore than acetic acid on its own.

In the presence of hydrogen peroxide and acetic acid, the galena is oxidised and goes into solution.

$$PbS + H_2O_2 + 2CH_3COOH \rightarrow Pb(CH_3COO)_2 + 2H_2O + S$$

Typically, after about 2 hours residence time in the rock, the leachate contains 2–3% lead. Other elements are also leached from the rock, so the leachate typically also contains about 2% calcium, 0.15% manganese, and 0.25% zinc, as well as much smaller concentrations of other elements. The leachate typically is of pH between 5 and 7. It also contains carbon dioxide in solution.

The leachate is first sprayed through a low pressure chamber 16 through which air flows along a spiral path in counter current to the leachate; this removes carbon dioxide from solution. The leachate is then passed through an ultraviolet cell 18 to cause precipitation of any silver or any platinum group metals that may be present, the cell incorporating a filter to remove any such precipitate. It is next passed through an ion-exchange cell 20 to remove any copper or nickel ions.

The leachate is then subjected to three successive stripping operations using selective solvent extraction, with organic liquids in stripping cells 22, 24 and 26. In each case the leachate is contacted with an organic liquid containing a compound that forms a complex with one of the metal ions (lead, zinc, and manganese, respectively), the organic liquid is then separated from the leachate, and is then contacted with dilute nitric acid into which the respective metal ion dissolves.

Any remaining heavy metals in solution are then removed from the leachate by treatment with hydrogen sulphide in a treatment cell 28 (and removal of the precipitate). Excess acetic acid is removed using an electrodialysis cell 30, and finally the carbon dioxide from the chamber 16 is mixed with the calcium-containing leachate in a vortex mixer 32, and the leachate is treated electrochemically in a cell 34 to form a precipitate of calcium carbonate, the precipitate being separated using a cyclone 36. Operation of the cells 30 and 34 is described in more detail later, in relation to FIG. 5. The leachate at this stage has had substantially all the heavy metal ions removed from it, so after addition of hydrogen peroxide, it may be reused as leachant in the boreholes 12. As described below, the hydrogen peroxide for this use is preferably generated, directly or indirectly, in conjunction with the retrieval of lead and manganese oxide.

The further processing of the aqueous metal solutions produced by the solvent extraction operations, in cells 22, 24 and 26, will now be described, in relation to FIGS. 2, 3 and 4 respectively.

Figure 2:
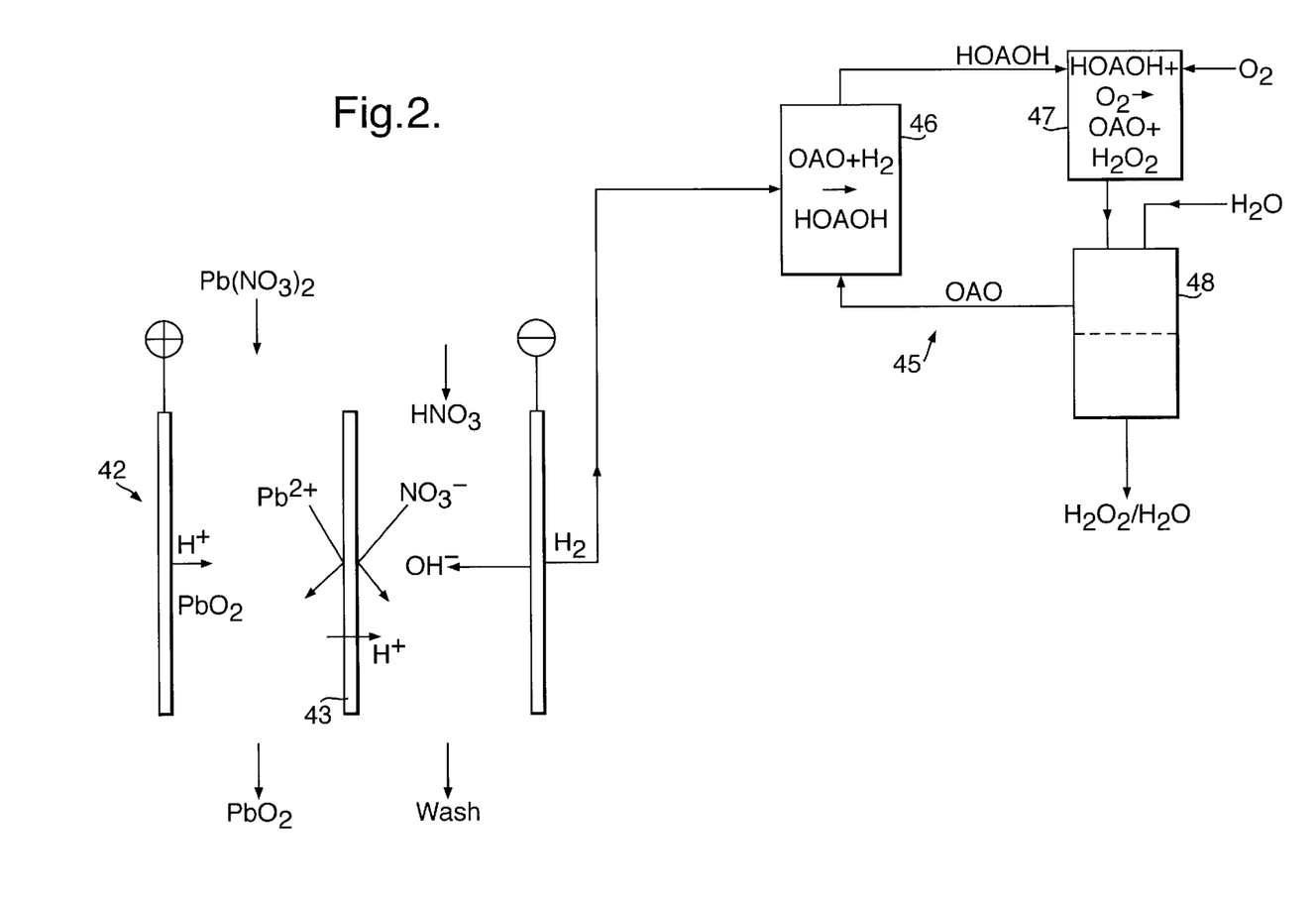
FIG. 2 shows in greater detail part of the lead oxide retrieval plant of the mining plant of FIG. 1.

Referring to FIG. 2, part of a lead oxide retrieval plant 40 is shown for treating the solution of lead nitrate produced by the cell 22. The solution is passed through an anodic chamber of an electrochemical cell 42 in which the anolyte and catholyte are separated by a membrane 43 selectively permeable to mono-valent cations; dilute nitric acid solution is supplied to the catholyte. Lead dioxide is deposited on the anode and hydrogen ions pass through the membrane 43 to carry the current. The reaction occurring at the anode can be written:

$$2H_2O+Pb(NO_3)_2 \rightarrow PbO_2+2HNO_3+2H^++2e^-$$

This strips most of the lead from the anolyte. The $PbO_2$ tends to fall off the anode, though if necessary the polarity of the voltage across the cell 42 may be changed briefly at intervals, so the $PbO_2$ falls off as a granular deposit. It is flushed out of the cell 42 by the flow of anolyte and is recovered as sludge from a cyclone separator 44, as shown in FIG. 1.

At the cathode of the cell 42 hydrogen gas is evolved, which is supplied to a hydrogen peroxide forming plant 45. Ideally the catholyte is unaffected, and can therefore be recirculated, though it is preferably washed with an organic stripping solvent to ensure removal of any lead ions that may pass through the membrane 43, prior to recirculation. The hydrogen gas, in the plant 45, is first contacted in a contactor 46 with a solution of an organic-substituted anthraquinone (OAO) in an organic solvent, and reacting to produce the corresponding hydroxy-compound (HOAOH). This hydroxy-compound is then mixed with air in a contactor 47, oxygen reacting with the hydroxy-compound (HOAOH) to reform the anthraquinone (OAO) and to form hydrogen peroxide. The hydrogen peroxide is then separated from the organic materials by mixing with water in a mixer-settler unit 48. The organic materials are then returned to the contactor 46.

It will be appreciated that the material of which the cathode of the cell 42 is made is desirably one that preferentially evolves hydrogen rather than reducing the nitric acid (generating $NO_x$). Platinised titanium is suitable for this purpose. A cation-exchange membrane may be provided in intimate contact with the cathode (which may then be of another material such as carbon or stainless steel) so that the current flows to the cathode by proton transfer resulting from water splitting in the cation-exchange membrane. This ensures that hydrogen is evolved, and very significantly suppresses nitrate ion reduction.

Referring again to FIG. 1, the lead dioxide sludge from the cyclone 44 may be dried, for example using microwave heating; but if desired it may be subjected to radio frequency drying and heating as indicated at 49, to convert it to lead monoxide, because the lead dioxide is electrically conducting whereas the lead monoxide is an insulator. At above about 300° C. lead dioxide converts to lead monoxide.

Figure 3:
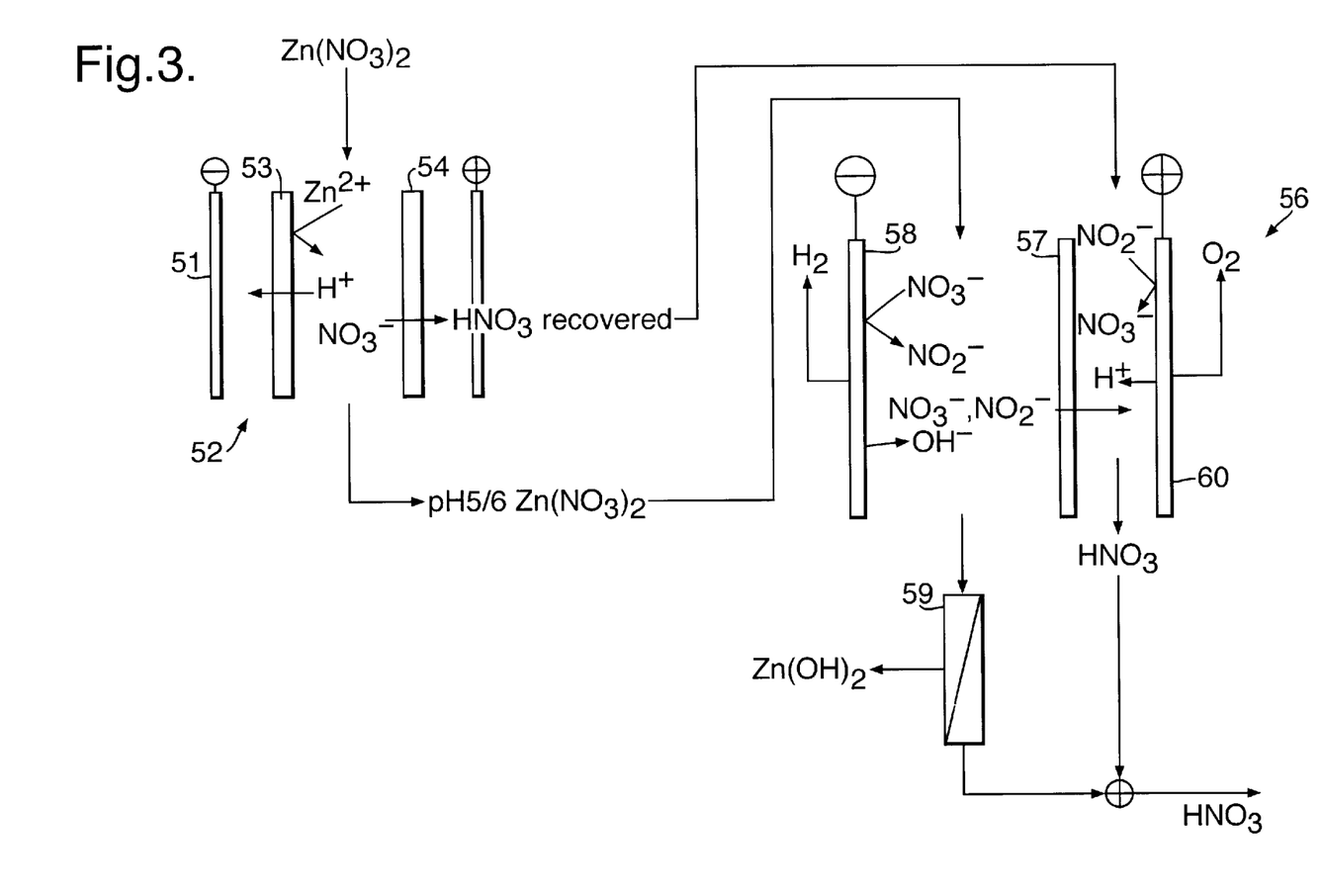
FIG. 3 shows in greater detail part of the zinc oxide retrieval plant of the mining plant of FIG. 1.

Referring now to FIG. 3, part of the zinc oxide retrieval plant 50 is shown for treating the solution of zinc nitrate produced by the cell 24. The zinc nitrate solution is first passed through an electrodialysis cell 52, being passed between a membrane 53 that is selectively permeable to monovalent cations, and a membrane 54 selectively permeable to anions; the anolyte and catholyte are both dilute nitric acid. The pH of the solution is hence raised to about pH 5 or 6 as the nitric acid is separated from the zinc nitrate. At the cathode 51 hydrogen gas is evolved (which may be supplied to the hydrogen peroxide plant 45 of FIG. 2), while nitric acid is recovered from the anolyte. There may, in practice, be a stack of such electrodialysis membranes, arranged alternately between a single pair of electrodes, as is commonly the case in electrodialysis cells.

The zinc nitrate solution at pH 5/6 is then supplied as the catholyte to an electrochemical cell 56 in which the anolyte and catholyte are separated by a membrane 57 selectively permeable by anions. At the cathode 58 water is electrolysed, generating hydrogen gas, and hydroxide ions so that the pH rises. Nitric acid from the anolyte of the electrodialysis cell 52 is supplied as anolyte to the cell 56. Nitrate ions from the zinc nitrate solution pass through the membrane 57, which also tends to raise the pH of the catholyte. Consequently the catholyte becomes alkaline, typically about pH 9, and zinc hydroxide precipitates, and can be separated as a sludge by a separator 59 (shown as a cyclone in FIG. 1). If any nitrate ions are reduced to nitrite ions at the cathode 58, these tend to pass through the membrane 57, and will tend to be oxidised back to nitrate ions at the anode 60; because the pH is greater than 5, nitrogen oxides are not formed. The nitric acid from the anolyte of the cell 56, along with the catholyte after removal of the precipitate, can be recombined and recycled for use in the stripping cell 24.

Referring again to FIG. 1, the hydrated zinc oxide precipitated sludge from the separator 59 can then be dried and dehydrated by microwave heating as indicated at 62, to form zinc oxide.

Figure 4:
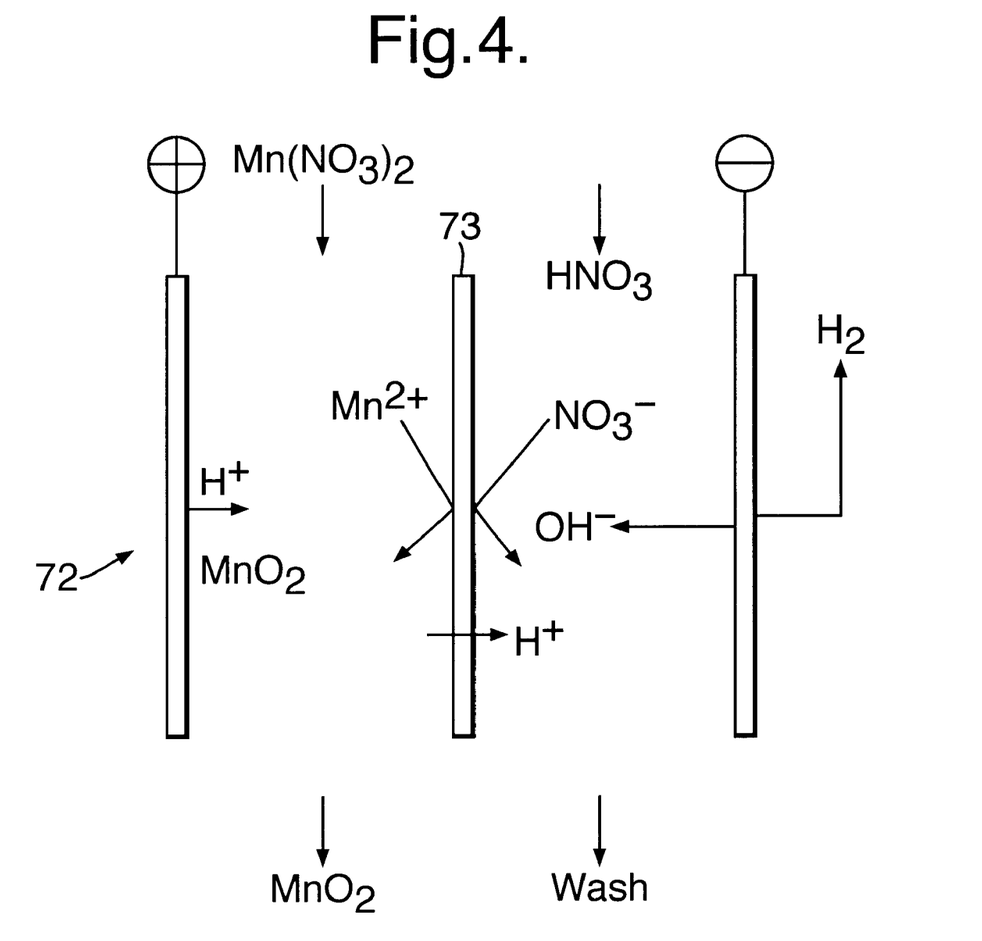
FIG. 4 shows in greater detail part of the manganese oxide retrieval plant of the mining plant of FIG. 1.

Referring now to FIG. 4 part of the manganese dioxide retrieval plant 70 is shown for treating the solution of manganese nitrate produced by the cell 26. The plant 70 is very similar to the plant 40 for retrieving lead oxide. The solution is passed through an anodic chamber of an electrochemical cell 72 in which the anolyte and catholyte are separated by a membrane 73 selectively permeable to monovalent cations; dilute nitric acid solution is supplied to the catholyte. Manganese dioxide is deposited on the anode and hydrogen ions pass through the membrane 73 to carry the current.

The reaction occurring at the anode can be written:

$$2H_2O+Mn(NO_3)_2 \rightarrow MnO_2+2HNO_3+2H^++2e^-$$

This strips most of the manganese from the anolyte. The $MnO_2$ tends to fall off the anode and is flushed out of the cell 72 by the flow of anolyte and is recovered as sludge from a cyclone separator 74, as shown in FIG. 1, although as with the lead oxide, a transient polarity reversal may be used to undercut the granular deposit, thus releasing the $MnO_2$ from the anode.

At the cathode of the cell 72 hydrogen gas is evolved, which may be supplied to the hydrogen peroxide forming plant 45. Ideally the catholyte is unaffected, and can therefore be recirculated, though it is preferably washed with an organic stripping solvent to ensure removal of any manganese ions that may pass through the membrane 43, prior to recirculation.

Figure 5:
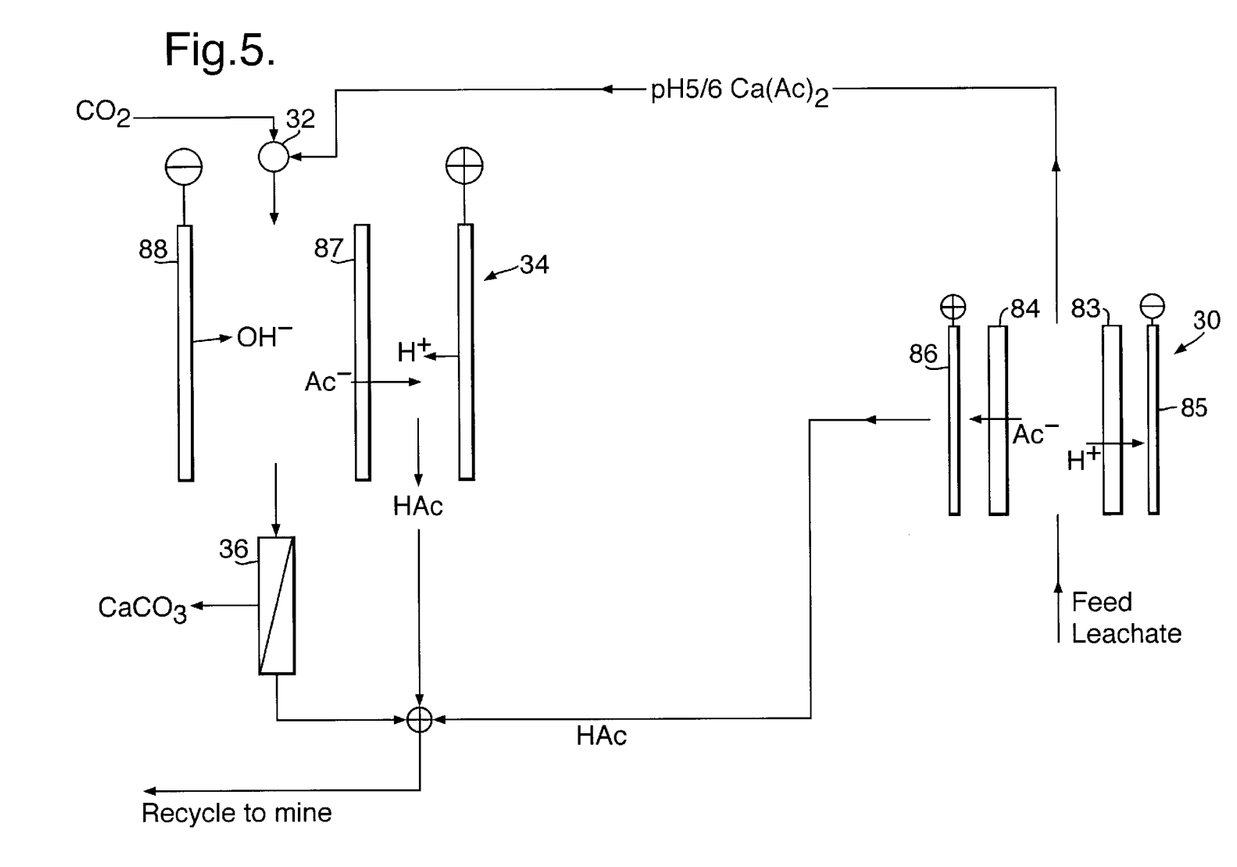
FIG. 5 shows in greater detail part of the calcium carbonate retrieval plant of the mining plant of FIG. 1.

Referring down to FIG. 5, the leachate, after removal of all but the most soluble cations, is passed through the electrodialysis cell 30, in which it passes through an ion extracting channel between a membrane 83 that is selectively permeable to monovalent cations, and a membrane 84 selectively permeable to anions; the anolyte and catholyte are both dilute acetic acid. These membranes are arranged alternately as a stack between a cathode 85 and an anode 86 (only one pair of membranes is shown). At the cathode 85 hydrogen gas is evolved, while acetic acid can be recovered from the concentration channels. The effect of this electrodialysis cell 30 is to remove excess acetic acid, which is recycled for use as leachant, and the solution of calcium acetate emerges at a pH of about 5 or 6. Finally, carbon dioxide from the chamber 16 (see FIG. 1) is mixed with the solution of calcium acetate, in the vortex mixer 32, and the solution is then treated electrochemically in the cell 34.

The calcium acetate solution at pH 5/6 containing carbon dioxide (and so containing calcium bicarbonate) is supplied as the catholyte to the electrochemical cell 34, in which the anolyte and catholyte are separated by a membrane 87 selectively permeable by anions. At the cathode 88 water is electrolysed, generating hydrogen gas, and hydroxide ions so that the pH rises. Water is supplied as anolyte to the cell 34, and acetate ions pass through the membrane 87, which also tends to raise the pH of the catholyte. Consequently the catholyte becomes alkaline, typically about pH 9, and calcium carbonate precipitates, and can be separated as a sludge by the separator 36 (shown as a cyclone in FIG. 1). The acetic acid from the anolyte of the cell 34, along with the catholyte after removal of the precipitate, can be recombined and recycled for use as leachant; for this purpose it is not necessary to remove all the calcium acetate.

It will be appreciated that the above description is given by way of example only. It will also be appreciated that all those cathodes at which hydrogen gas is evolved may be used as a source of hydrogen gas for a hydrogen peroxide plant 45 as in FIG. 2, and indeed that all those anodes at which oxygen gas is evolved may be used as a source of oxygen gas for the contactor 47 of the hydrogen peroxide plant 45. In the lead retrieval plant 40 and the manganese oxide retrieval plant 70, hydrogen gas is evolved and is then used in making hydrogen peroxide, but it will be appreciated that hydrogen peroxide may be made more directly.

Figure 6:
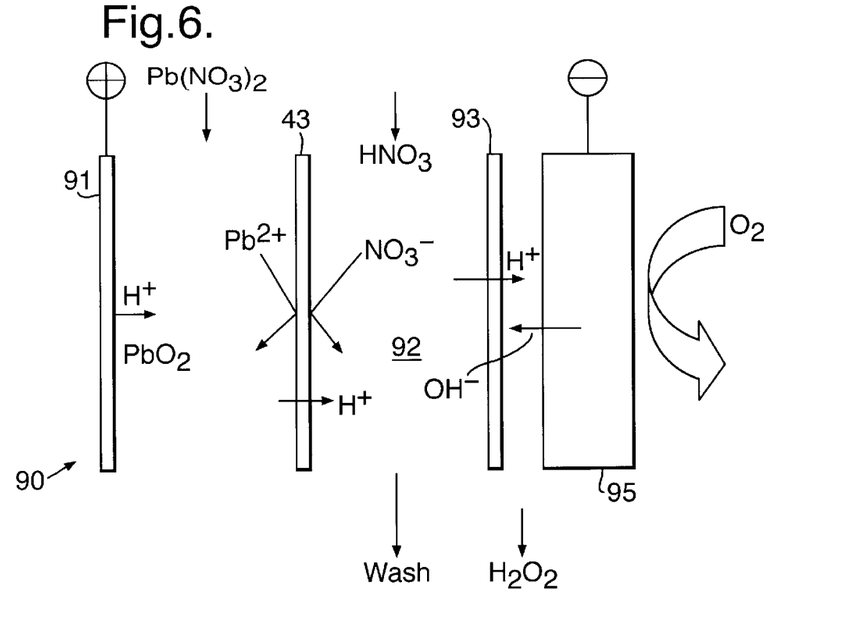
FIG. 6 shows an alternative to the lead oxide retrieval cell of FIG. 2.

Referring now to FIG. 6 there is shown an alternative cell 90 for use in the retrieval of lead oxide; an identical cell could equally be used in the retrieval of manganese dioxide. The cell 90 has many features in common with the cell 42 of FIG. 2, the solution of lead nitrate produced by the cell 22 being passed as anolyte in the vicinity of the anode 91 of the electrochemical cell 90, and the anolyte is separated by a membrane 43, selectively permeable to mono-valent cations, from the remainder of the cell 90. Lead dioxide is deposited on the anode and hydrogen ions pass through the membrane 43 to carry the current. The $PbO_2$ tends to fall off the anode, and is flushed out of the cell 90 by the flow of anolyte and is recovered as sludge from a cyclone separator 44, as shown in FIG. 1.

The cell 90 includes a central compartment 92, bounded on one side by the membrane 43 and bounded on its other side by a membrane 93 selectively permeable to cations. Dilute nitric acid solution is supplied to the central compartment 92. Ideally the electrolyte in this central compartment 92 is unaltered during operation, and can therefore be recirculated, though it is preferably washed with an organic stripping solvent to ensure removal of any lead ions that may pass through the membrane 43, prior to recirculation. Immediately adjacent to the other surface of the membrane 93 is a gas diffusion electrode 95 connected to act as a cathode, for example a carbon felt electrode whose rear surface is impregnated with a chemically resistant non-wettable polymer such as polytetrafluoroethylene (PTFE) so that water cannot pass through it, though it is gas permeable. The rear surface of the gas diffusion electrode 95 is in contact with the atmosphere. The membrane 93 is in contact with the front surface of the gas diffusion electrode 95, the gap shown in the drawing being merely for clarity.

In operation hydrogen ions pass across the central compartment 92 and through the membrane 93 (under the influence of the electric field) and oxygen gas diffuses through the electrode 95. In the electrode 95 the oxygen reacts with the water to form hydrogen peroxide.

Figure 7:
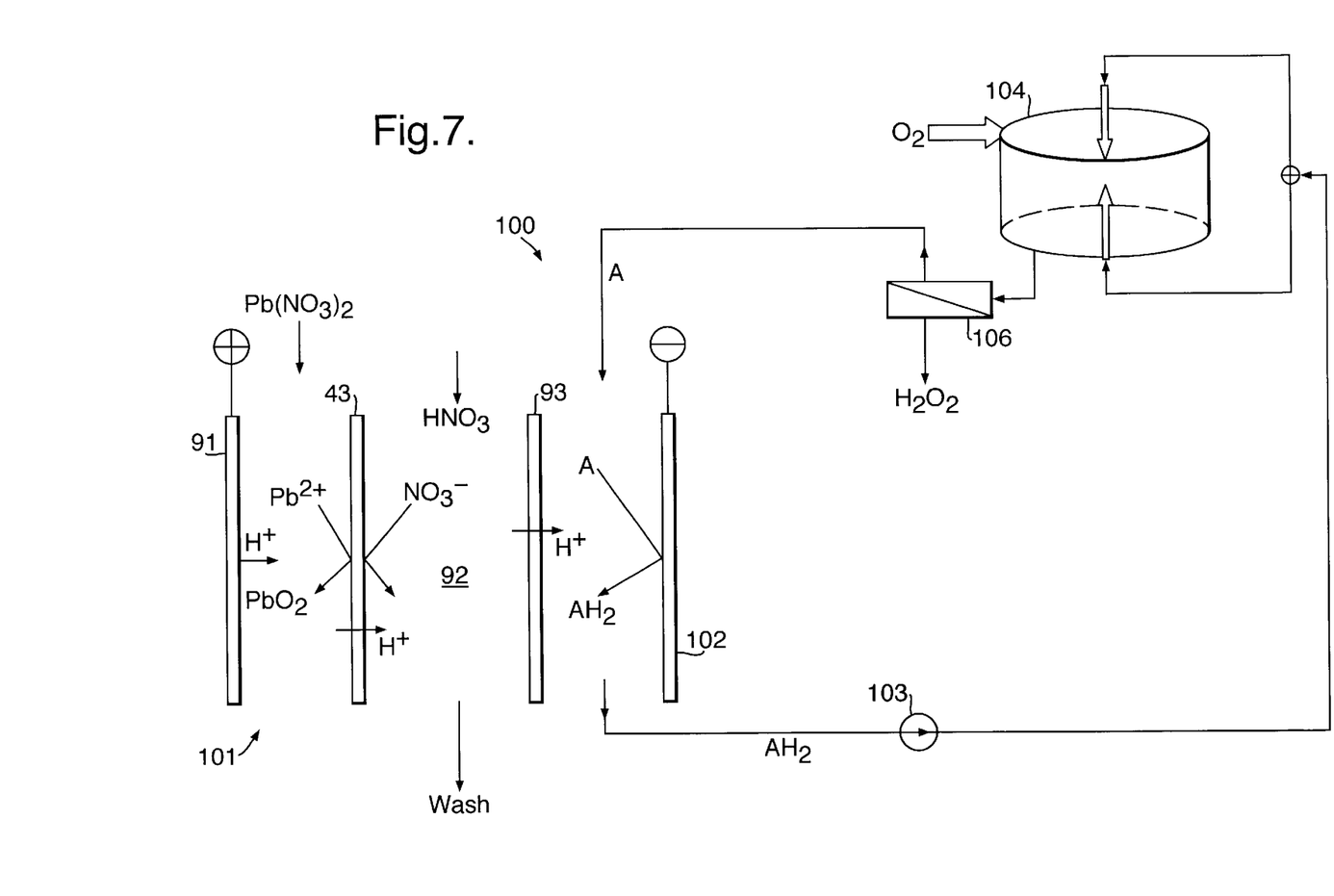
FIG. 7 shows another alternative to the lead oxide retrieval cell of FIG. 2.

Referring now to FIG. 7 there is shown an alternative plant 100 for use in the retrieval of lead oxide or of manganese dioxide. The plant 100 incorporates an electrolytic cell 101 that has many features in common with the cell 90 of FIG. 6, the solution of lead nitrate produced by the cell 22 being passed through an anodic chamber of the cell 101 in which the anolyte is bounded on one side by a membrane 43, selectively permeable to mono-valent cations. Lead dioxide precipitates at the anode 91. A central compartment 92 is bounded on one side by the membrane 43 and bounded on its other side by a membrane 93 selectively permeable to cations. Dilute nitric acid solution is supplied to the central compartment 92. In all these respects the cell 101 is the same as the cell 90.

On the other side of the membrane 93 is a catholyte chamber containing a cathode 102. The catholyte is an aqueous solution of a water-soluble anthraquinone such as anthraquinone 2,6 disulphonate (A). Hydrogen ions pass through the membrane 93, and react at the cathode 102 with the anthraquinone 2,6 disulphonate to form hydro-anthraquinone 2,6 disulphonate ($AH_2$). The catholyte is pumped by a pump 103 to a vortex contactor 104 in which it is contacted with air. The air is pumped tangentially into the contactor 14 so it follows a spiral path towards an outlet at the centre of an end wall, while opposed jets form droplets that flow radially outwards, hitting the outer wall and collecting in the base from where it flows through an outlet. Oxygen from the air reacts with the hydro-anthraquinone 2,6 disulphonate to form anthraquinone 2,6 disulphonate and hydrogen peroxide. This solution is then passed through a nanofilter 106 with a molecular weight cut off of about 100, the anthraquinone 2,6 disulphonate solution then being returned to the catholyte, and the solution of hydrogen peroxide being used for regenerating the leachant.

Figure 8:
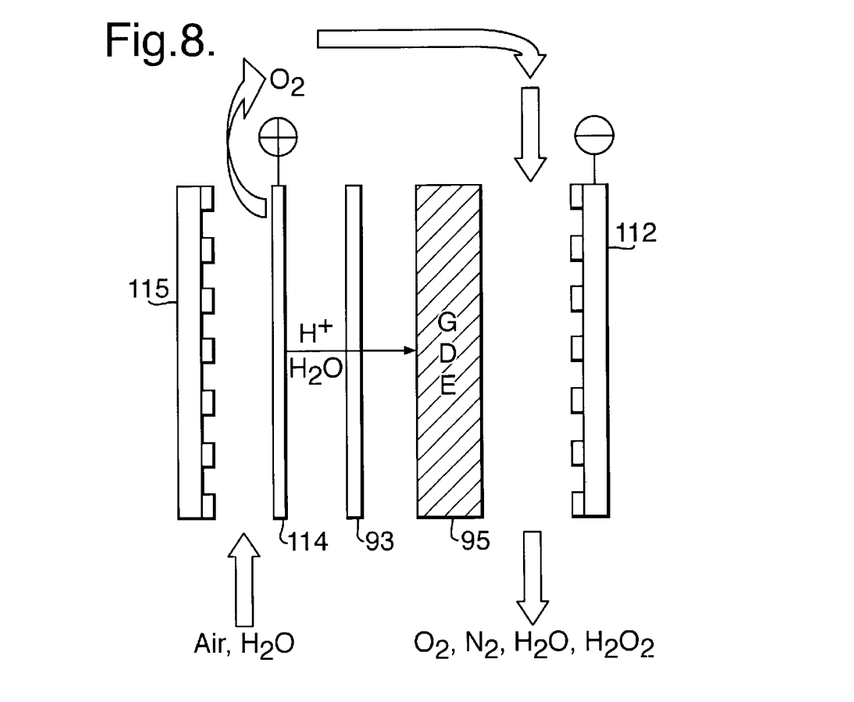
FIG. 8 shows a dedicated hydrogen peroxide generating cell for use in the plant of FIG. 1.

It will be appreciated that hydrogen peroxide for regenerating the leachant may also be generated with dedicated plant. For example such a hydrogen peroxide generator may comprise plant similar to that of FIG. 7, but with the anode 91 immersed in dilute nitric acid, and with the omission of the membrane 43. An alternative dedicated plant for producing hydrogen peroxide has some features in common with the plant of FIG. 6; this plant 110 is shown in exploded form in FIG. 8. The plant 110 consists of a gas diffusion electrode 95 between a cation-permeable membrane 93 and a current collector 112 (which defines longitudinal flow channels). On the other side of the membrane 93 is a wire mesh anode 114 and an end plate 115 (which defines longitudinal flow channels). All these components are sandwiched and bonded together, the gaps shown in the drawing merely being for clarity. In operation, an air stream is bubbled through water and then passed through the flow channels in the end plate 115 adjacent to the anode 114; electrolysis of the water generates oxygen, and hydrogen ions which pass through the membrane 93. The gas stream containing extra oxygen is then passed through the flow channels in the current collector 112, and in the gas diffusion electrode 95 oxygen reacts with water and hydrogen ions to form hydrogen peroxide. The resulting gas stream can then be bubbled through a second water bath to remove the hydrogen peroxide.

It will be appreciated that such a plant for generating hydrogen peroxide directly or indirectly, using an electrochemical cell, may be used in other applications. For example it might be used to generate hydrogen peroxide for use in a plant to scrub a gas stream to remove pollutants such as $NO_x$, odours, or $H_2S$.

The aim of the present invention is to achieve regeneration of the leachant without requiring the addition of significant quantities of chemicals, as many of the operations as possible being performed electrochemically. A significant aspect is the formation of desired useful products (lead oxide, zinc oxide, manganese dioxide, and calcium carbonate) by electrochemical processes, which where possible are combined with regeneration of the leachant (e.g. producing hydrogen peroxide). The process described in relation to FIG. 1 removes substantially all metal ions from the leachate to regenerate acetic acid, apart from some calcium ions which are not detrimental to the leaching process. If the leachate includes significant quantities of soluble metal ions such as sodium or potassium, these are separated in the electrodialysis cell 30 (see FIG. 5), so that the catholyte will form a sodium/potassium hydroxide solution.

Figure 9:
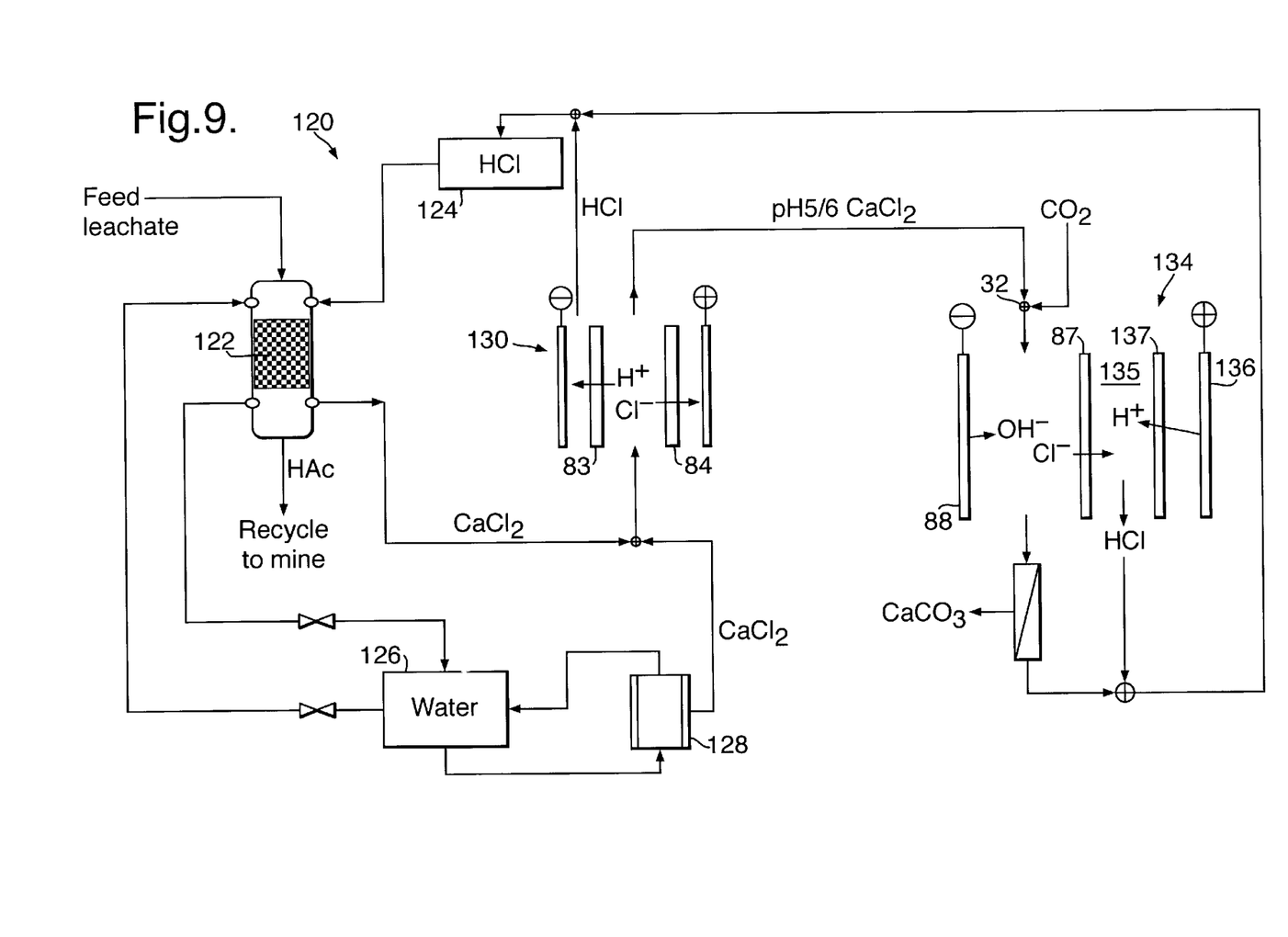
FIG. 9 shows an alternative to the calcium carbonate retrieval plant of FIGS. 1 and 5.

Referring to FIG. 9 there is shown a flow diagram for a calcium carbonate retrieval plant 120 that avoids the need to treat the entire stream of leachate by electrodialysis in the cell 30, as shown in FIGS. 1 and 5; some features are identical to those of the plant of FIG. 5 and are given the same reference numerals. The treated leachate emerging from the sulphide precipitation cell 28, marked Feed Leachate, consists primarily of calcium acetate and acetic acid. This is passed through a cation exchange ion exchange column 122 which traps the calcium ions, so that the resulting acetic acid can be recycled as described in relation to FIG. 1. When the exchange column 122 is saturated with calcium it is regenerated using hydrochloric acid solution from a storage tank 124, and then rinsed with water from a storage tank 126, before being reused for treating the feed leachate. (There may be two such ion exchange columns 122, used alternately, so one is in use while the other is being regenerated.)

The water from the rinse water tank 126 may contain calcium chloride, and is circulated through an electrodialysis cell 128 (containing a stack of alternate anion permeable and cation permeable membranes) to generate clean water and concentrated calcium chloride solution; the clean water is returned to the tank 126, while the concentrated calcium chloride solution is combined with the concentrated calcium chloride solution obtained during the regeneration step. The concentrated calcium chloride solution is then passed through an electro-dialysis cell 130 in which it passes through an ion-extracting channel between a membrane 83 that is selectively permeable to monovalent cations, and a membrane 84 selectively permeable to anions, arranged alternately in a stack (only one pair of membranes is shown). The effect of this cell 130 is to remove excess hydrochloric acid, which is taken from the concentrating channel and recycled to the storage tank 124, and the solution of calcium chloride emerges at a pH of about 5 or 6. Finally, carbon dioxide from the chamber 16 (or from another source if necessary) is mixed with the solution of calcium chloride in a vortex mixer 32, and the solution is treated electrochemically in the cell 134.

In the cell 134 the solution of calcium chloride and carbon dioxide acts as the catholyte, passing adjacent to the cathode 88 at which hydroxide ions are formed, so that the catholyte becomes alkaline, typically about pH 9, and calcium carbonate precipitates to be separated by the separator 36. The catholyte is separated by a membrane 87 selectively permeable to anions from a central channel 135; and the channel 135 is separated from the anode 136 by a membrane 137 selectively permeable to cations. The anolyte may be nitric acid solution. Hence hydrogen ions are generated by electrolysis at the anode 136, and pass through the membrane 137 into the channel 135. Chloride ions from the catholyte pass through the membrane 87 into the channel 135. Hence hydrochloric acid forms in the central channel 135, and can be returned to the storage tank 124. The catholyte after removal of the precipitate can also be returned to the tank 124, as the bulk of the calcium ions have been removed. The cation permeable membrane 137 prevents chloride ions reaching the anode 136 and hence prevents formation of chlorine.

Thus, as with the plant of FIG. 5, the overall effect of the plant 120 is to remove calcium ions from the leachate and so regenerate acetic acid, and to form a precipitate of calcium carbonate.

We claim:

1. A method of solution mining in which an ore is treated with a solution of acetic acid and hydrogen peroxide so as to form a leachate containing lead ions and the lead is stripped by solvent extraction from the leachate to form an aqueous solution containing lead ions, wherein the aqueous solution containing lead ions is treated electrochemically in the anodic compartment of a separated electrochemical cell to form a precipitate of lead oxide.

2. A method as claimed in claim 1 wherein the leachate also contains zinc ions which are stripped by solvent extraction from the leachate to form an aqueous solution containing zinc ions, and the aqueous solution containing zinc ions is then treated electrochemically in the cathodic compartment of a separated electrochemical cell to form a precipitate of zinc hydroxide.

3. A method as claimed in claim 2 wherein in the divided electrochemical cell in which a metal oxide is generated in the anodic compartment, the cathode compartment is used to generate hydrogen peroxide.

4. A method as claimed in claim 1 wherein the leachate also contains manganese ions which are stripped by solvent extraction from the leachate to form an aqueous solution containing manganese ions, and the aqueous solution containing manganese ions is treated electrochemically in the anodic compartment of a separated electrochemical cell to form a precipitate of manganese dioxide.

5. A method as claimed in claim 4 wherein in the or each divided electrochemical cell in which a metal oxide is generated in the anodic compartment, the cathode compartment is used to generate hydrogen peroxide.

6. A method as claimed in claim 1 wherein the aqueous solution containing lead ions, after passing through the anodic compartment of the separated electrochemical cell, is recirculated back to the same compartment via a separation means to remove the precipitate.

7. A method as claimed in claim 6 wherein the separation means is a cyclone.

8. A method as claimed in claim 1 wherein in the divided electrochemical cell in which a metal oxide is generated in the anodic compartment, the cathode compartment is used to generate hydrogen peroxide.

9. A method as claimed in claim 8 wherein the hydrogen peroxide is generated directly, using a gas diffusion electrode as the cathode.

10. A method as claimed in claim 8 wherein the hydrogen peroxide is generated indirectly by generating hydrogen at the cathode, and then using the hydrogen along with a reagent such as anthraquinone in a process to form hydrogen peroxide.

11. A method as claimed in claim 8 wherein the hydrogen peroxide is generated indirectly by using a water-soluble anthraquinone derivative that can be reduced at the cathode and subsequently reacted with air to form hydrogen peroxide.

12. A method as claimed in claim 1 wherein calcium ions are removed, at least partially, by adding carbon dioxide to the leachate solution, and then treating it electrochemically in the cathodic compartment of a separated electrochemical cell so as to precipitate calcium carbonate.

13. A method of solution mining in which an ore is treated with a solution of acetic acid and hydrogen peroxide so as to form a leachate containing lead ions and the lead is stripped by solvent extraction from the leachate to form an aqueous solution containing lead ions, wherein hydrogen peroxide is generated directly in an electrochemical cell with a gas diffusion electrode as the cathode.

14. A method of solution mining in which an ore is treated with a solution of acetic acid and hydrogen peroxide so as to form a leachate containing lead ions and the lead is stripped by solvent extraction from the leachate to form an aqueous solution containing lead ions, wherein hydrogen peroxide is generated indirectly by generating hydrogen at a cathode of an electrochemical cell, and using the hydrogen in a chemical process to form hydrogen peroxide.

15. A method of solution mining in which an ore is treated with a solution of acetic acid and hydrogen peroxide so as to form a leachate containing lead ions and the led is stripped by solvent extraction from the leachate to form an aqueous solution containing lead ions, wherein hydrogen peroxide is generated indirectly by reducing a water-soluble anthraquinone derivative at a cathode of an electrochemical cell, and then reacting it with air to form hydrogen peroxide.

16. A method of solution mining in which an ore is treated with a leachate containing hydrogen peroxide, so as to form a leachate containing metal ions, and the metal ions are stripped from the leachate by solvent extraction to form an aqueous solution containing the metal ions, wherein the aqueous solution is treated electrochemically in an anodic compartment of a separated electrochemical cell, and the cathodic compartment of the cell is used directly or indirectly to generate hydrogen peroxide.

17. A method as claimed in claim 16 wherein the metal ions comprise lead ions and/or manganese ions.

* * * * *